May 30, 1961  J. A. KARP ET AL  2,986,188

SELF-ALIGNING AND SEALING CLINCH NUT

Filed Jan. 12, 1959

INVENTORS
JOSEPH A. KARP
WENDALL M. B. HAAS

BY

*Walter J. Jason*

ATTORNEY

United States Patent Office 2,986,188
Patented May 30, 1961

2,986,188
SELF-ALIGNING AND SEALING CLINCH NUT

Joseph A. Karp, Claremont, and Wendall M. B. Haas, Covina, Calif., assignors to General Dynamics Corporation, San Diego, Calif., a corporation of Delaware Filed Jan. 12, 1959, Ser. No. 786,067

1 Claim. (Cl. 151—41.73)

The present invention generally relates to variable alignment nuts, and more particularly relates to a self-aligning clinch nut which embodies a nut member held floatably adjacent an aperture in such a manner that, although the nut member cannot rotate, its alignment with the aperture can be varied.

An obvious function of such a device is to eliminate the need for close center to center tolerances in patterns of screw holes.

Prior nuts performing the same function are generally larger, heavier, and more difficult and time consuming to work with. The conventional plate or basket-nut, for instance, requires three holes and a riveting operation in order to be installed. In contrast, the self-aligning clinch nut requires but one hole for installation. Naturally attendant with this ease of installation are a reduction in installation time and cost.

It is therefore an object of the present invention to provide a self-aligning clinch nut which embodies a nut member whose alignment can be varied.

Another object is to provide a self-aligning clinch nut which embodies nut means for receiving a screw and grip means for preventing rotation of said nut means while permitting variation of the alignment of said nut means.

Another object is to provide a self-aligning clinch nut which embodies nut means for receiving a screw and grip means for holding said nut means adjacent a screw aperture while permitting variation of alignment relative to said aperture and preventing rotation of said nut means.

Other objects and features of the present invention will be readily apparent to those skilled in the art from the following specification and appended drawings wherein various configurations of the present invention are illustrated and in which.

Figure 4:
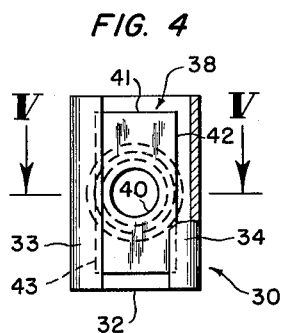
Figure 5:
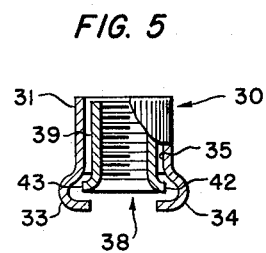
Figure 6:
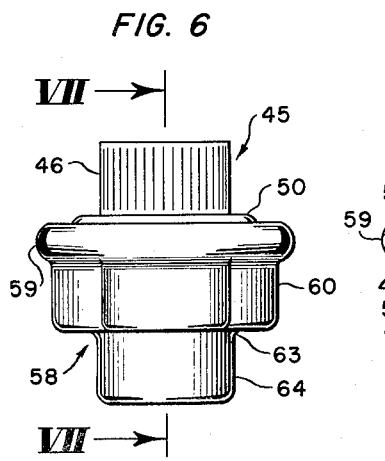
Figure 7:
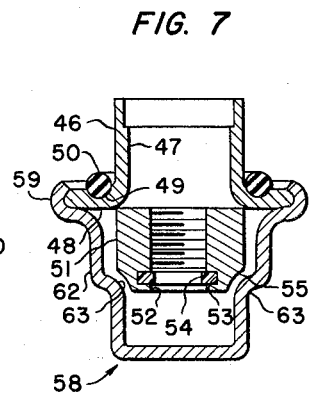
Figure 8:
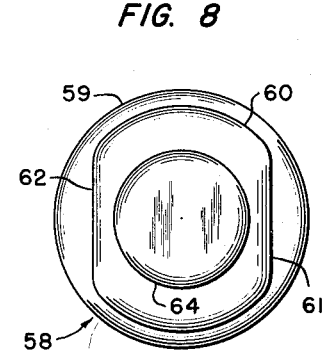

Figure 4 is an elevational view of another form of the self-aligning clinch nut with a portion thereof broken away for clarity of illustration, Figure 5 is a cross-sectional view taken along line V—V of Figure 4, Figure 6 is an elevational view of a third form of the present invention, Figure 7 is a cross-sectional view taken along line VII—VII of Figure 6, and Figure 8 is an end or bottom view of the self-aligning clinch nut as shown in Figure 6.

Figure 1:
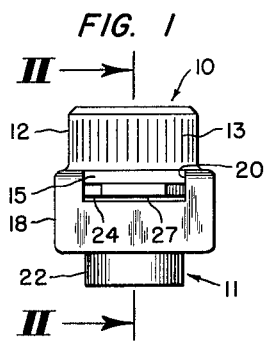
Figure 1 is an elevational view of one form of the self-aligning clinch nut.
Figure 2:
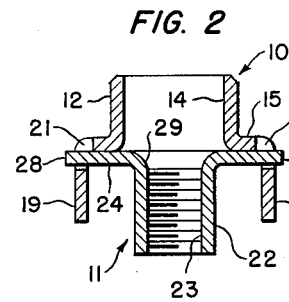
Figure 2 is a cross-sectional view taken along line II—II of Figure 1.
Figure 3:
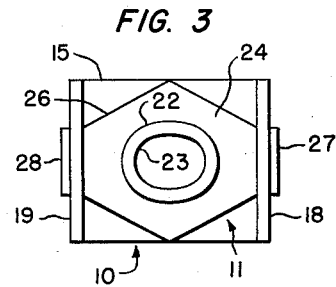
Figure 3 is an end or bottom view of the article as shown in Figure 1.

Referring now to the drawings, the self-aligning clinch nut illustrated in Figures 1 through 3 is shown comprised of a grip member 10 and a nut member 11. Grip member 10 has a cylindrical insert portion 12 having longitudinal surface serrations 13. A bore or hole 14 is concentrically disposed within insert portion 12 and extends therethrough. At one end of insert portion 12 the grip member diverges into a base plate 15 having a substantially rectangular shape. Two opposite edges 18 and 19 of this base plate are turned away from, and lie parallel to, insert portion 12. Each of these turned edges has a substantially rectangular opening therein, which openings are indicated by numerals 20, 21, and are located at the bends or corners formed between the base plate and the turned edges.

The nut member 11 shown in Figures 1 through 3 has a tubular portion 22 with threaded hole 23 concentrically disposed therein and extending therethrough. This tubular portion and the threaded hole 23 therein have a cross section that is ellipsoidal or "off round." The hole 23 is also smaller than hole 14 of grip member 10.

At one end of tubular portion 22 the nut member 11 spreads out into a flange or nut head 24. Two protrusions or extensions 27 and 28 form a part of this nut head and are located opposite each other thereon. Extensions 27 and 28 are substantially rectangularly shaped and protrude into the turned edge apertures 20 and 21 respectively. The fit between these extensions and apertures is a loose or sloppy fit which results in nut member 11 being held in a kind of "floating" relationship with respect to grip member 10. The nut head 24 has edges, such as 26, which meet the extensions 27 and 28 at an obtuse angle, thus permitting the nut head also to travel some distance into the aperture. The same amount of travel however, or degree of floating engagement, could be achieved by having a smaller but square nut head with larger extensions or protrusions. Similarly, other shapes of nut heads could conceivably be used to cooperate with the grip member apertures to achieve the floating engagement.

The role played by this "floating" engagement can be best illustrated by considering the manner in which the self-aligning clinch nut is utilized. Thus, to utilize this device the serrated insert portion 12 of the grip member is pressed into a hole in an element through which it is desired to attach a screw to a nut. With grip member 10 thus attached to the element, the nut member 11 is located below the hole through which the screw is to be placed. The nut member, however, is free to move about because of its floating engagement with the grip member. The alignment of hole 23 with respect to the grip member is therefore a variable quantity. When a screw is inserted through grip member hole 14 it will contact nut member 11. The slightest pressure on the screw, or possibly its weight alone, will cause the nut member to float or move into proper alignment with the screw so that it can be subsequently engaged with the threaded hole 23. The hole 23 is shown with a flared mouth 29 which facilitates alignment, but the slight taper existing on the very end of most screws would make the device operable without such a flared mouth.

As the screw is turned to achieve threaded engagement with the nut member the nut member attempts to turn with it but is substantially restrained from so doing by extensions 27 and 28 which protrude into apertures 20 and 21 of the grip member. The grip member, in turn, is prevented from rotating by the serrations 13 on the surface of insert portion 12 which bite into the material surrounding the insert portion.

The present invention thus provides an easy to use nut that is particularly useful where close hole tolerance is a problem or in applications where a nut cannot be conveniently held in place by hand during the screwing operation.

An alternate configuration of the present invention which can also be used in these and similar applications is shown in Figures 4 and 5. The grip member 30 shown therein has a serrated insert portion 31 having a hole 35 concentrically disposed therein and extending therethrough. A base or plate 32 extends perpendicularly from one end of serrated insert portion 31 in an essentially rectangular shape. The opposite sides 33 and 34 of plate 32 are the long sides of the rectangle. These sides 33 and 34 are curled through 180° to form flanges facing each other and located diametrically opposite each other with respect to the hole 35 of insert portion 31.

A nut member 38 used in conjunction with this grip member 30 has a cylindrical sleeve 39 disposed in hole 35 of insert portion 31. A threaded hole 40 is concentrically disposed within sleeve 39 and extends therethrough. The sleeve diverges at one end into a rectangular flange 41 lying adjacent and parallel plate 32 of the grip member. The long edges 42 and 43 of flange 41 lay spacially adjacent and within the turned sides 33 and 34 of grip member plate 32. The outer diameter of sleeve 39 is substantially smaller than the diameter of hole 35, thus providing a loose or sloppy fit. The rectangular flange 41 is also a loose fit within the turned edges of the grip member. The net result is the nut member being floatably held in the grip member. This floating engagement permits the threaded hole 40 to be variably aligned within the grip member but, at the same time, prevented from rotating to any appreciable degree. This restriction of rotation is due to the fact that as the nut member attempts to rotate, the edges 42 and 43 of its rectangular flange 41 will contact and be stopped by the turned edges 33 and 34 of the grip member.

Thus, the configuration disclosed in Figures 4 and 5 will function in the same manner, and fulfill the same needs, as the embodiment illustrated in Figures 1 through 3.

There may however, be applications where it is desired to have the screw aperture or hole sealed against fluid leakage, either in or out. The form of the present invention depicted in Figures 6 through 8 is designed to provide such fluid tight sealing. Shown in these figures is a grip member 45 having a serrated and cylindrical insert portion 46. A hole 47 extends through the length of the cylindrical insert portion to provide an entry for a screw. An annular or ring type flange 48 is disposed about one end of insert portion 46. An O-ring groove 49 is disposed in the annular flange area lying immediately adjacent the insert portion. An O-ring seal 50 is positioned in groove 49 and provides a fluid tight seal about a hole into which insert portion 46 may be pressed.

Disposed adjacent annular flange 48 and the end of hole 47 is a square nut member 51 having a hole 52 therethrough. A chamfer 55 is found on the lower edges of nut member 51. The major part of nut hole 52 is threaded, but at its lower end a circumferential bushing groove 53 is set in the wall thereof. A screw lock bushing 54, or binder bushing, is positioned in groove 53.

Enclosing nut member 51 is a cap member 58 having a mouth or cap rim 59 clamped about the annular flange 48 of grip member 45. Immediately adjacent cap rim 59 is a partially round cap section 60 having flat sides 61 and 62 diametrically opposite each other. These flat sides lay spacially adjacent two sides of the nut member and prevent any appreciable rotation of the nut. A neck portion 63 converging from partially round section 60 provides a surface which is substantially parallel to the chamfer surface 55 of the nut member and causes the nut member to be loosely retained adjacent grip member hole 47. And, while the nut member cannot rotate to any substantial degree, it is still free to move about so that the alignment of nut hole 52 can be varied. The stepped and closed cylindrical cap end portion 64 extends somewhat beyond nut member 51 in order to permit a screw to protrude through nut member 51.

In use, the grip member is pressed into a hole and a fluid tight seal is created about the hole by the O-ring and groove arrangement. A screw is inserted through grip member hole 47 and contacts nut member 51. Pressure on, or turning of, the screw causes nut member 51 to "float" into proper alignment therewith and permit threaded engagement. Rotation of the nut is prevented by the flat cap sides, and cap rotation is prevented by the cap rim being clamped to the grip member. When the screw makes contact with bushing 54 it creates or gouges threads in the bushing and at the same time produces a bind between the screw and bushing. With nut member 51 securely tightened down against grip member 45, and a tight bind between screw and bushing, very little, if any, fluid can leak into or from grip member hole 47. As an added precaution, however, another O-ring seal could be used in or adjacent cap rim 59 if so desired.

Thus, the self-aligning clinch nut configuration shown in Figures 6 through 8 fulfills a need not met by the other arrangements illustrated. Then too, it is conceivable that variations on each configuration illustrated may be readily apparent to those skilled in the art. It is intended, therefore, that the invention is to be given its broadest possible interpretation within the terms of the following claim.

What we claim is:

A self-aligning clinch nut having a grip member, a cap member, and a nut member, said grip member comprising a substantially cylindrical insert portion with exterior serrations that prevent its rotation when pressed into a hole, a hole disposed substantially concentrically within and extending through said insert portion, an annular flange about one end of said insert portion, said flange having a groove and an O-ring seal about said insert portion seated in said groove of said annular flange, said flange and O-ring seal creating a fluid tight seal when said insert portion is pressed into a hole, said cap member comprising a cap having flange means clamped in tight fitting engagement with said annular flange of said grip member, said cap having a bottom portion with two flat sides, a stepped portion having a closed end, and an indented neck portion connecting said stepped portion to said bottom portion, said neck portion being inclined inwardly from said bottom portion to said stepped portion, said nut member comprising a substantially rectangular nut having a hole therethrough from one side to the other, a portion of said hole being threaded from said one side, said nut cooperating with said two flat sides in preventing any appreciable rotation of said nut while permitting variation in alignment of said hole with respect to said grip member hole, a chamfer surface on said other side of said nut substantially parallel to the surface of said neck portion and lying thereagainst for loosely retaining said nut within said bottom portion of said cap and maintaining said one side of said nut adjacent said flanged end of said grip member to receive a screw that may be positioned therethrough, and a lock bushing in said hole adjacent said threaded portion to bind a screw that may be engaged therewith.

References Cited in the file of this patent

UNITED STATES PATENTS

| | | |
|---|---|---|
| 2,243,923 | Swanstrom | June 3, 1941 |
| 2,647,004 | Stieglitz | July 28, 1953 |
| 2,688,497 | Brisack | Sept. 7, 1954 |
| 2,816,591 | Reiner | Dec. 17, 1957 |
| 2,827,097 | Nuss | Mar. 18, 1958 |

FOREIGN PATENTS

| | | |
|---|---|---|
| 800,198 | Great Britain | Aug. 20, 1958 |
| 1,135,944 | France | Dec. 22, 1956 |